(12) United States Patent
Chen et al.

(10) Patent No.: US 8,374,974 B2
(45) Date of Patent: Feb. 12, 2013

(54) NEURAL NETWORK TRAINING DATA SELECTION USING MEMORY REDUCED CLUSTER ANALYSIS FOR FIELD MODEL DEVELOPMENT

(75) Inventors: Dingding Chen, Plano, TX (US); John A. Quirein, Georgetown, TX (US); Jacky M. Wiener, Aurora, CA (US); Jeffery L. Grable, Houston, TX (US); Syed Hamid, Dallas, TX (US); Harry D. Smith, Jr., Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1813 days.

(21) Appl. No.: 10/393,641

(22) Filed: Mar. 21, 2003

(65) Prior Publication Data

US 2004/0133531 A1    Jul. 8, 2004

Related U.S. Application Data

(60) Provisional application No. 60/438,259, filed on Jan. 6, 2003.

(51) Int. Cl.
*G06F 15/18* (2006.01)
*G06G 7/00* (2006.01)

(52) U.S. Cl. .......................................................... 706/8

(58) Field of Classification Search ...... 707/3; 702/183, 702/179, 6, 9, 14, 7; 324/303; 395/22; 435/6; 716/4; 709/203; 381/41; 23/230; 250/269.4; 358/518; 706/8, 21, 46; 73/784
See application file for complete search history.

(56) References Cited

U.S. PATENT DOCUMENTS

| | | | | |
|---|---|---|---|---|
| 3,975,157 | A | * | 8/1976 | Smith .............................. 436/31 |
| 4,293,933 | A | | 10/1981 | Park et al. ........................ 367/25 |
| 4,646,240 | A | | 2/1987 | Serra et al. ..................... 364/422 |
| 4,926,488 | A | * | 5/1990 | Nadas et al. ................... 704/233 |
| 5,067,164 | A | | 11/1991 | Denker et al. |
| 5,112,126 | A | | 5/1992 | Graebner ....................... 356/152 |
| 5,245,696 | A | | 9/1993 | Stork et al. |
| 5,251,286 | A | | 10/1993 | Wiener et al. ................... 395/22 |
| 5,465,321 | A | * | 11/1995 | Smyth ............................ 706/20 |
| 5,469,404 | A | | 11/1995 | Barber et al. ................... 367/23 |

(Continued)

FOREIGN PATENT DOCUMENTS

WO        WO 99/64896        12/1999

OTHER PUBLICATIONS

'Structured Programming':O J Dahl, E W Dikstra C A R Hoare, 1972, Academic Press, pp. 7 and 19.*

(Continued)

*Primary Examiner* — Kakali Chaki
*Assistant Examiner* — Peter Coughlan
(74) *Attorney, Agent, or Firm* — Krueger Iselin LLP; Benjamin Fite

(57) ABSTRACT

A system and method for selecting a training data set from a set of multidimensional geophysical input data samples for training a model to predict target data. The input data may be data sets produced by a pulsed neutron logging tool at multiple depth points in a cases well. Target data may be responses of an open hole logging tool. The input data is divided into clusters. Actual target data from the training well is linked to the clusters. The linked clusters are analyzed for variance, etc. and fuzzy inference is used to select a portion of each cluster to include in a training set. The reduced set is used to train a model, such as an artificial neural network. The trained model may then be used to produce synthetic open hole logs in response to inputs of cased hole log data.

3 Claims, 10 Drawing Sheets

U.S. PATENT DOCUMENTS

| | | | | |
|---|---|---|---|---|
| 5,475,509 | A * | 12/1995 | Okamoto | 358/518 |
| 5,517,854 | A * | 5/1996 | Plumb et al. | 73/152.59 |
| 5,659,667 | A | 8/1997 | Buescher et al. | |
| 5,848,379 | A | 12/1998 | Bishop | 702/6 |
| 5,870,690 | A | 2/1999 | Frenkel et al. | 702/7 |
| 5,875,284 | A | 2/1999 | Watanabe et al. | 395/11 |
| 5,940,777 | A | 8/1999 | Keskes | 702/16 |
| 6,092,017 | A | 7/2000 | Ishida et al. | 701/106 |
| 6,140,816 | A * | 10/2000 | Herron | 324/303 |
| 6,163,155 | A | 12/2000 | Bittar | |
| 6,192,352 | B1 | 2/2001 | Alouani et al. | 706/8 |
| 6,207,953 | B1 * | 3/2001 | Wilson | 250/269.4 |
| 6,272,434 | B1 * | 8/2001 | Wisler et al. | 702/9 |
| 6,295,504 | B1 | 9/2001 | Ye et al. | 702/7 |
| 6,317,730 | B1 | 11/2001 | Neuneier et al. | 706/2 |
| 6,374,185 | B1 | 4/2002 | Taner et al. | 702/6 |
| 6,381,591 | B1 | 4/2002 | Hoffmann et al. | 702/2 |
| 6,411,903 | B2 | 6/2002 | Bush | 702/14 |
| 6,424,956 | B1 | 7/2002 | Werbos | 706/2 |
| 6,456,990 | B1 | 9/2002 | Hoffmann et al. | 706/2 |
| 6,466,893 | B1 * | 10/2002 | Latwesen et al. | 702/179 |
| 6,823,711 | B1 | 11/2004 | Chen et al. | |
| 6,911,824 | B2 | 6/2005 | Bittar | |
| 7,019,528 | B2 | 3/2006 | Bittar | |
| 7,039,621 | B2 | 5/2006 | Agrafiotis et al. | |
| 7,043,463 | B2 | 5/2006 | Bonabeau et al. | |
| 7,053,787 | B2 | 5/2006 | Schultz et al. | |
| 7,138,803 | B2 | 11/2006 | Bittar | |
| 7,170,418 | B2 | 1/2007 | Rose-Pehrson et al. | |
| 7,243,056 | B2 | 7/2007 | Olhofer et al. | |
| 7,265,552 | B2 | 9/2007 | Bittar | |
| 7,280,987 | B2 | 10/2007 | Chen et al. | |
| 7,308,134 | B2 | 12/2007 | Wersing et al. | |
| 7,328,107 | B2 | 2/2008 | Strack et al. | |
| 7,363,280 | B2 | 4/2008 | Jin et al. | |
| 7,363,281 | B2 | 4/2008 | Jin et al. | |
| 7,565,833 | B2 | 7/2009 | Gillen et al. | |
| 7,587,373 | B2 | 9/2009 | Smith, Jr. | |
| 7,610,251 | B2 | 10/2009 | Shayegi et al. | |
| 7,613,665 | B2 | 11/2009 | Chen et al. | |
| 7,814,036 | B2 | 10/2010 | Chen et al. | |
| 2002/0147695 | A1 | 10/2002 | Khedkar et al. | 706/15 |
| 2002/0152030 | A1 * | 10/2002 | Schultz et al. | 702/6 |
| 2002/0165911 | A1 * | 11/2002 | Gabber et al. | 709/203 |
| 2002/0170022 | A1 * | 11/2002 | Shirai et al. | 716/4 |
| 2002/0177954 | A1 * | 11/2002 | Vail, III | 702/7 |
| 2002/0178150 | A1 * | 11/2002 | Hytopoulos et al. | 707/3 |
| 2002/0183932 | A1 * | 12/2002 | West et al. | 702/14 |
| 2002/0187469 | A1 * | 12/2002 | Kolodner et al. | 435/6 |
| 2002/0188424 | A1 * | 12/2002 | Grinstein et al. | 702/183 |
| 2004/0019427 | A1 | 1/2004 | San Martin et al. | |
| 2005/0114280 | A1 | 5/2005 | Rising, III | |
| 2005/0246297 | A1 | 11/2005 | Chen et al. | |
| 2006/0195204 | A1 | 8/2006 | Bonabeau et al. | |
| 2006/0256655 | A1 | 11/2006 | Sinha et al. | |
| 2007/0019865 | A1 | 1/2007 | Owechko et al. | |
| 2007/0167846 | A1 | 7/2007 | Sternickel et al. | |
| 2007/0183670 | A1 | 8/2007 | Owechko et al. | |
| 2007/0235225 | A1 | 10/2007 | Bittar | |
| 2008/0154809 | A1 | 6/2008 | Stockwell et al. | |
| 2008/0228680 | A1 | 9/2008 | Chen et al. | |

OTHER PUBLICATIONS

'Structured Programming': Dahl, Dijkstra, Hoare, 1972, Academic Press, A.P.I.C. STudies in data Processing No. 8, pp. 7, 19.*

'Use of multiattribute transforms to predict log properties from seismic data': Hampson, 2001, Society of Exploration Geophysicists, Geophysis vol. 66. No. 1, pp. 220-236.*

FlowJo Reference Manual, FlowJo Version 4, www.flowjo.com/v4/html/cluster.html; "Clustering—A New, Highly Efficient Algorithm for Cluster Analysis", pp. 1-3. downloaded Dec. 30, 2002.

FlowJo Reference Manual, FlowJo Version 4, www.flowjo.com/v4/html/clusterprocess.html; "Play-by-Play of Clustering Process", pp. 1-2, downloaded Dec. 30, 2002.

FlowJo Reference Manual, FlowJo Version 4, www.flowjo.com/v4/html/clusterparams.html; "Clustering Algorithm Parameters", pp. 1-5, downloaded Dec. 30, 2002.

Chakraborti, N et al., "A Study of the Cu Clusters Using Gray-Coded Genetic Algorithms and Differential Evolution", Journal of Phase Equilibria and Diffusion, vol. 25, No. 1, (Apr. 2007), pp. 13-21.

Chakraborti, N. et al., "A Study of the Cu Clusters Using Gray-Coded Genetic Algorithms and Differential Evolution", Journal of Phase Equilibria and Diffusion, vol. 25, No. 1, pp. 13-21, (Apr. 2007).

Chandra, Arjun et al., "Ensemble Learning Using Multi-Objective Evolutionary Algorithms", Journal of Mathematical Modeling and Algorithms, (2006), pp. 417-445.

Chandra, Arjun et al., "Ensemble Learning Using Multi-Objective Evolutionary Algorithms", Kluwer Academic Publishers, (2005), pp. 1-34.

Chen, Dingding et al., "Neural Network Ensemble Selection Using Multi-Objective Genetic Algorithm in Processing Pulsed Neuron Data", SPWLA 45th Annual Logging Symposium, (2004), 13 pgs.

Chen, Dingding et al., "Neural Network Ensemble Selection Using Multi-Objective Genetic Algorithm in Processing Pulsed Neuron Data", Petrophysics, vol. 46, No. 5, (Jun. 6-9, 2004), 13 pgs.

Chen, Tai-Cong et al., "Acceleration of Levenberg-Marquardt Training of Neural Networks with Variable Decay Rate", IEEE, (2003), pp. 1873-1878.

Eberhart, Russell et al., "A New Optimizer Using Particle Swarm Theory", Micro Machine and Human Science, (Oct. 1995), pp. 39-43.

Maulik, Ujjwal et al., "Genetic algorithm-based clustering technique", Pattern Recognition, vol. 33, Issue 9, Sep. 2000, pp. 1455-1465, ISSN 0031-3203, 10.1016/S0031-3203(99)00137-5.

Van Den Bergh, Frans et al., "A Cooperative Approach to Particle Swarm Optimization", Evolutionary Computation, IEEE Transactions on, vol. 8, No. 3, pp. 225-239, Jun. 2004.

* cited by examiner

NEURAL NETWORK TRAINING DATA SELECTION USING MEMORY REDUCED CLUSTER ANALYSIS FOR FIELD MODEL DEVELOPMENT

CROSS-REFERENCE TO RELATED APPLICATIONS

The present application claims priority from U.S. Provisional Patent Application 60/438,259, filed on Jan. 6, 2003, which application is hereby incorporated by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention relates to neural networks trained to predict a parameter in response to a plurality of inputs, and more particularly to methods of using clustering techniques and fuzzy inference to select geophysical data for use in training a neural network to produce synthetic data.

BACKGROUND OF THE INVENTION

In the oil and gas industry today, there are several conditions that drive the need for non-traditional methods for obtaining open hole logging data. As a result, oil and gas companies are more inclined to explore such non-traditional methods for obtaining open hole logging data to help in their decision making processes. The use of cased hole logging data, in particular pulsed neutron data to generate pseudo or artificial open hole triple combo log information is one approach which has been tried.

One of the conditions is simple economics. Every operation carried out in a borehole takes time, which translates directly to increased cost of drilling the well. Therefore, if a logging operation in the well, e.g. an open hole log, can be avoided, it reduces the cost of drilling the well. If the same data can be obtained from another operation, e.g. a cased hole pulsed neutron log, then the actual open hole log can be skipped, saving time and money.

Adverse drilling conditions often make open hole logging expensive, risky or essentially impossible. Such conditions include extreme wash outs, shale bridges, caving, etc. These conditions may make it physically impossible to run an open hole logging tool in the hole. If the tool can be run, the conditions may prevent collection of useful data in at least portions of the well.

Modern drilling techniques may make open hole logging risky or impossible. For example highly deviated wells may have high rates of turn or high angles which make it difficult or impossible to run an open hole tool. Some companies use slim holes, e.g. 3.5 inch diameter wells, which are too small for available open hole logging tools. However, pulsed neutron logging tools are available for running in such wells after they are cased.

As a result of these conditions, efforts have been made to produce synthetic or artificial open hole type logs from real data taken by pulsed neutron logging tools. However, various difficulties have been encountered in developing the predictive tools or models which are used to create such synthetic logs. For this approach to be successful, the models must produce accurate synthetic logs which can be relied on.

Various predictive tools have been used in processing geological logging data for many years. A field data based predictive model usually takes selected measurements of specific logging tools as inputs and produces predicted outputs using either a deterministic function or an empirical function generated from a training process. As a typical predictive framework, the artificial neural network (ANN) has received special interest and demonstrates increased use in petrophysical applications. To build an ANN model, data are selected from well logs, trained with optimization algorithms, and tested in different wells for validation. In the course of this process, data selection not only produces the greatest impact on the scope and applicability of the model, but also affects its accuracy and generalization performance. This is especially true if a single model for the field/reservoir is desired, and the data for all training wells and testing wells need to be normalized to a "field histogram". Since the uncertainty induced by different environmental factors and/or systematic errors may somehow corrupt the field data integration and preprocessing, special attention and treatment should be given to training-data selection.

The training-data selection is more heuristic than systematic in most neural network applications. One of the common heuristic approaches is to use a predetermined data percentage to randomly select the training, validation and testing data sets, which may cause the training results to be sensitive to the specific data splitting, especially if only single well data is available. For multiple-well training-data selection, it is quite often the case to define a resampling strategy to remove a certain amount of data in each individual well, and make the combined data set fall within a specific size limit. This procedure allows the use of some powerful, but memory-constrained training algorithms (Levenberg-Marquardt-based algorithms, for example). Otherwise, some sub-optimal training algorithms (gradient-descent-based algorithms) must be used with sacrificed training accuracy. However, as discussed above, decision-making is difficult in determining the resampling strategy without a deep understanding of the nature of the multiple well data. Evenly scattered interval sampling (systematic sampling with respect to depth) with reduced density may remove some redundant data, but may also remove some useful information at the same time such as thin bed data.

There is a tendency today to integrate ANN technology with other data mining and artificial intelligence technologies for predictive model development. The advantages of using integrated technologies include enhanced predictability of the data, improved interpretability of the results, and extended applicability of the model. However, its trade-off with processing complexity should also be considered.

It would be desirable to have ways (1) remove faulty, redundant and insignificant data, (2) detect inconsistent data, (3) have the ability to "add", i.e., duplicate samples in key target zones.

SUMMARY OF THE INVENTION

The present invention provides improved methods for selecting training data for training a predictive model to predict target data and provides an improved trained model.

In one embodiment, input data is multidimensional geophysical data. The input data is divided into subsets and clustering methods are used to divide each subset into a plurality of clusters. A model or prototype is produced for each cluster. Clustering methods are applied to the prototypes to generate a second set of clusters. All original data is then assigned to the second clusters. The clusters are then analyzed to select data for use in training a model.

In one embodiment, target data is assigned to, or linked with, corresponding training data in each cluster. The combined data clusters are then analyzed to select data for use in training a model.

In one embodiment, the second clusters or combined clusters are analyzed for factors including cluster size and data variance or dispersion. Fuzzy inference is then used to select a portion of data from each cluster for inclusion in a training data set.

In one embodiment, the model is an artificial neural network trained to predict, or generate artificial, logging data as target data, in response to an input of actual logging data.

In one embodiment, the present invention provides a method of operating a field in which open hole logs are run in only a small number of wells, cased hole logs are run in all wells, a model is trained with the data collected in the logs, and the trained model is used to generate synthetic open hole logs for the wells in which actual open hole logs were not run.

DETAILED DESCRIPTION OF THE INVENTION

For prediction of the non-linear regression problem, the method of applying cluster analysis is to locate similar data patterns in input variables, and link them with other variables to be used as desired outputs in the training process. In essence, this involves identifying patterns in the joint distribution function. This procedure allows removal of bad data and redundant data, detection of inconsistent data, and evaluation of input/output non-linearity of different clusters associated with actual geological formations. It may also provide a qualitative link between clusters and zoned facies.

Many clustering algorithms are available for use. See U.S. Pat. No. 6,295,504, issued to Ye et al. on Sep. 25, 2001, which is hereby incorporated by reference for all purposes, for an example of use of a clustering method to identify facies of geological formations based on logging measurements. To perform cluster analysis on multiple-attribute input variables, one method is to (1) find the similarity between every pair of samples by calculating distance, (2) group the samples into a binary, hierarchical tree using the distance information generated in step (1), and (3) determine where to divide the hierarchical tree into clusters according to an inconsistency setting. However, most clustering algorithms work well on small data sets containing only a few hundred samples. In multiple-well model development, the data set may contain several tens of thousands of high-dimensional samples, making conventional approaches impossible for direct use due to an extremely large memory requirement.

Figure 1:
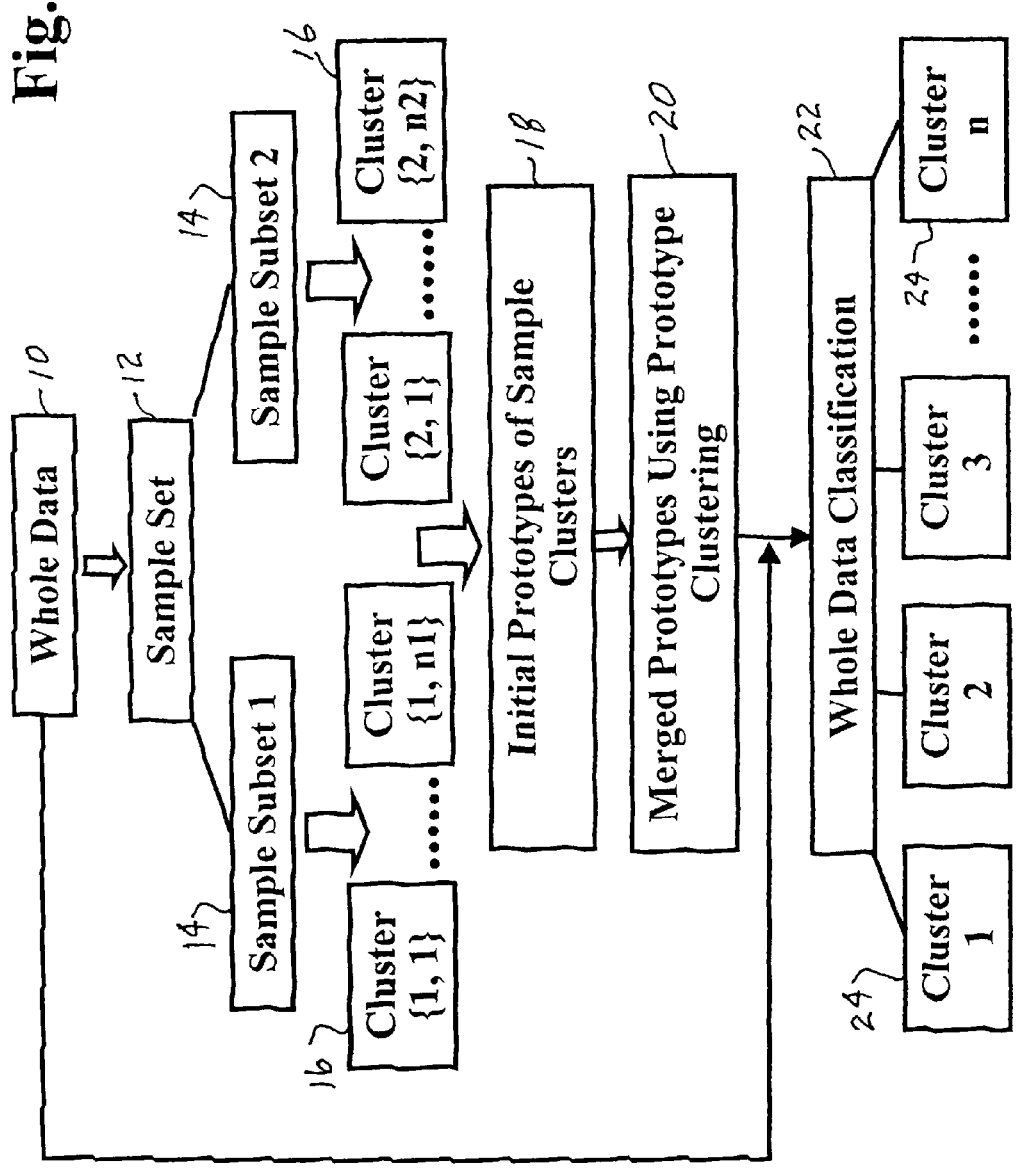
FIG. 1 is flow chart illustrating a method of generating input data clusters according to the present invention.

FIG. 1 is a flow chart that shows how data clusters are generated according to the present invention. The whole data set 10 of the training well(s) may be first reduced to a sample set 12, which may, for example, contain only a certain depth in a particular well or may contain data from only a portion of the wells which have been logged. The sample set 12 is then divided into several subsets 14, and hierarchical clustering is applied to each subset respectively to reduce the memory requirement. While FIG. 1 shows two subsets 14, it is understood that the sample set 12 may be divided into more than two subsets. Since the data has been divided into smaller subsets requiring less memory, more efficient and robust clustering methods may be used. This first-level or initial grouping puts together the data patterns with predetermined inconsistency into naturally divided clusters 16.

For each cluster 16, a single cluster sample prototype, or mathematical representation, is calculated at step 18. Since some prototypes drawn from different subsets may be similar, a second level clustering, among the different data subset prototypes, can be performed to merge those prototypes with a lower inconsistency setting, followed by determining a new cluster prototype at step 20. Note that since the second level clustering 20 is applied to the predetermined prototypes only, the memory requirement is limited, even though the information coverage may include all of the data from all of the training well(s). Depending on the total available data size, an intermediate clustering may be needed to make the final clustering manageable.

The flow chart discussed in FIG. 1 is suitable for the hierarchical clustering method, in which the inconsistency coefficient is set to different values between the initial clustering and the second level clustering. The prototype of each sample cluster can be a mean vector averaged over each attribute of cluster components. It can also be an actual sample nearest to the mean vector in Euclidean distance. Other clustering methods, such as density-based methods, model-based methods and self-organizing map, may also be used depending on the nature of the data.

After all cluster sample prototypes are determined at step 20, each multi-attribute input vector, that is each of the multidimensional data samples in the original data set 10, is then fitted into its nearest cluster based on the distance to the cluster prototype in step 22. This results in a second set of clusters 24 which contain all of the original data 10. The cluster prototypes are then adjusted for the whole data set, that is new prototypes are generated for each of the second clusters 24.

Figure 2A:
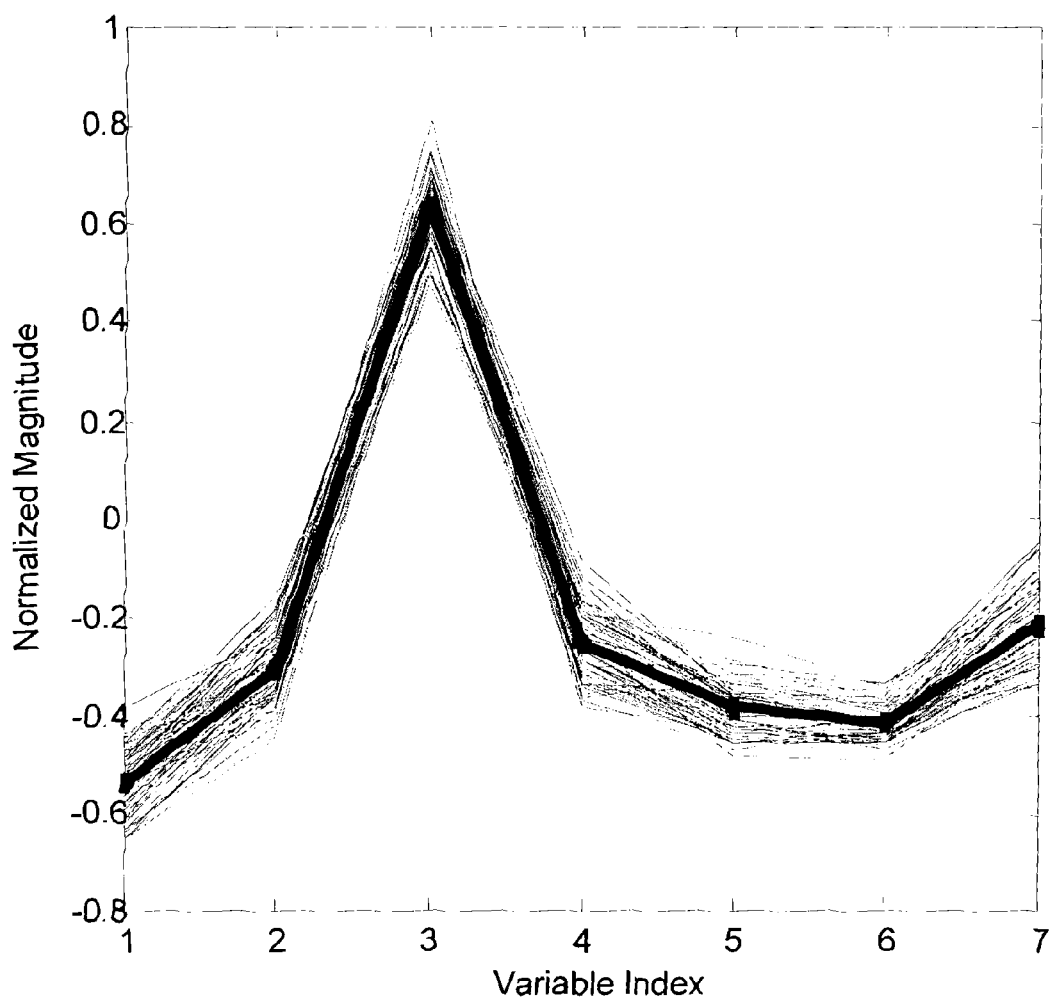
FIGS. 2A and 2B are illustrations of two input data clusters resulting from the process of FIG. 1.
Figure 2B:
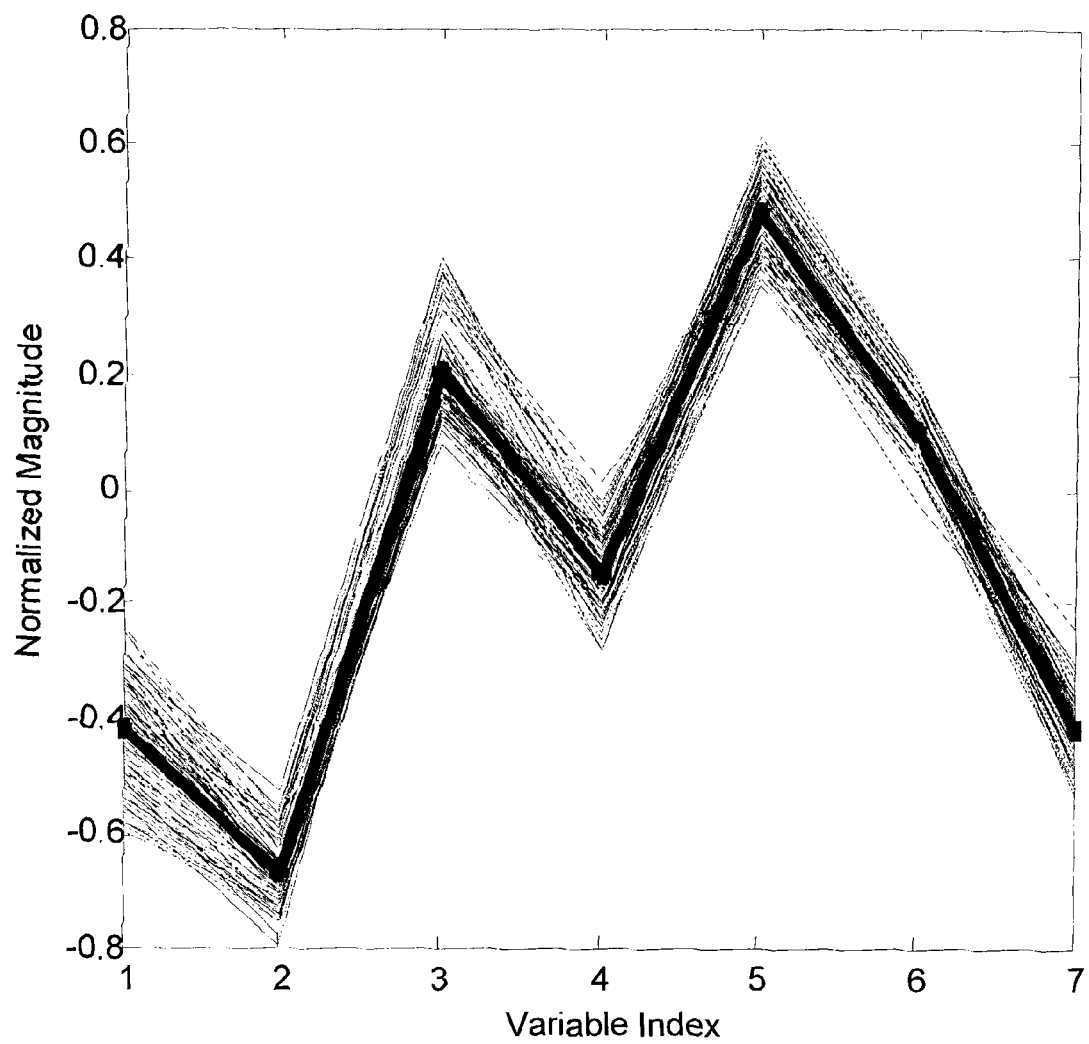
Figure 3A:
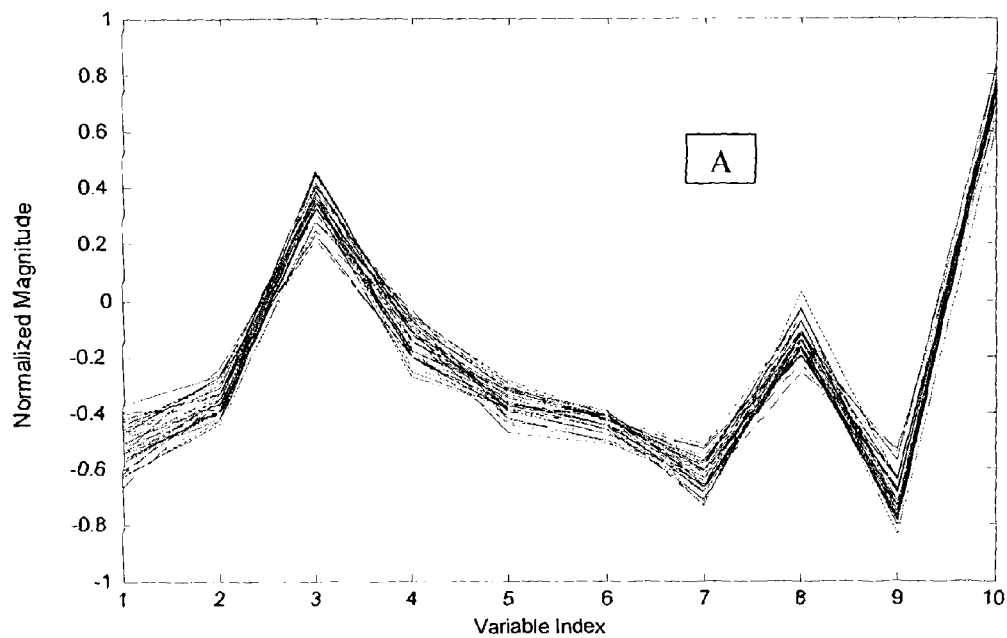
FIGS. 3A, 3B, 3C and 3D are illustrations of four data clusters including target data linked to the input data clusters.
Figure 3B:
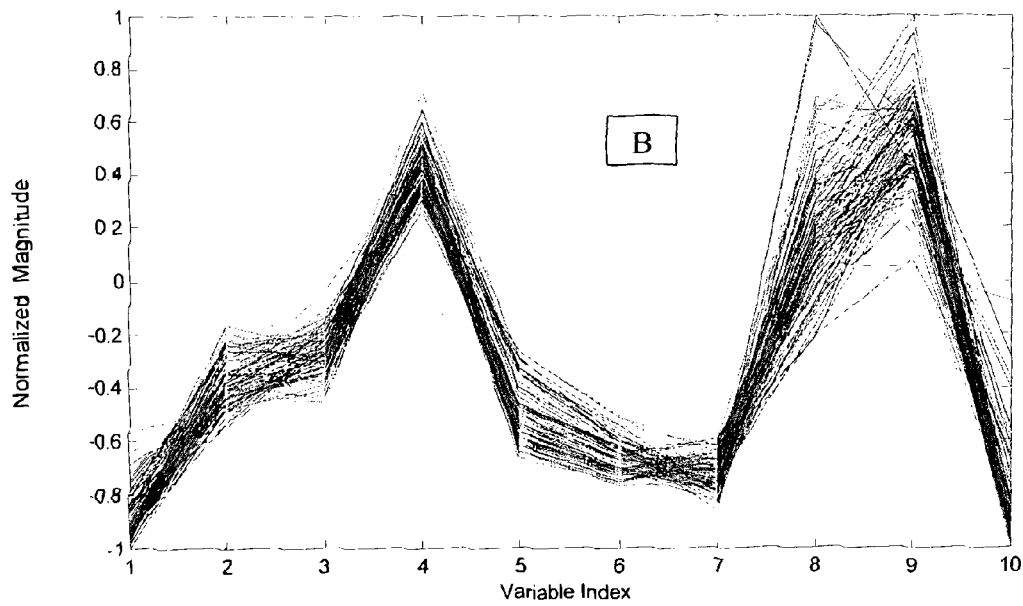
Figure 3C:
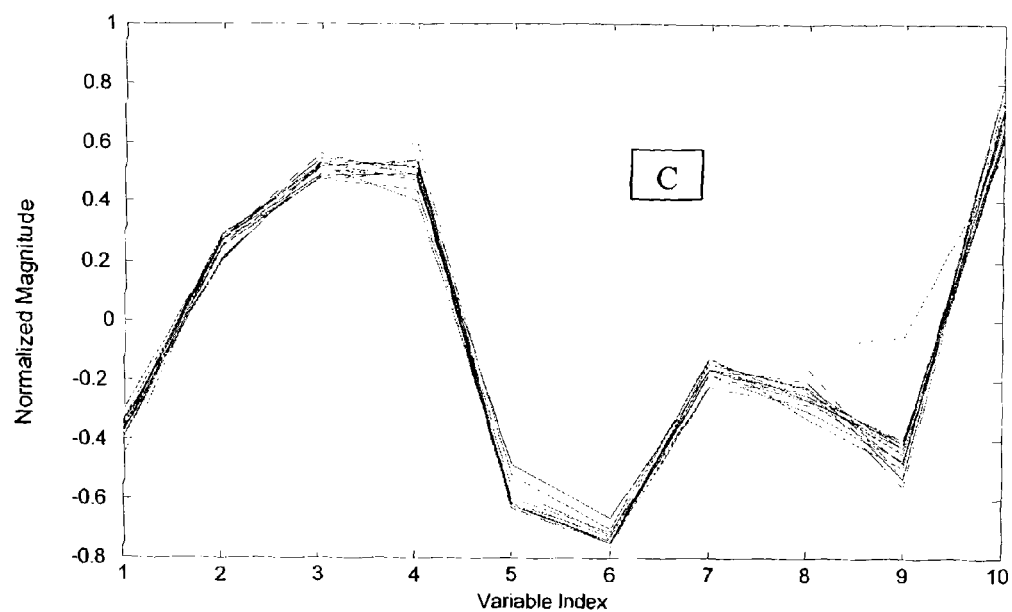
Figure 3D:
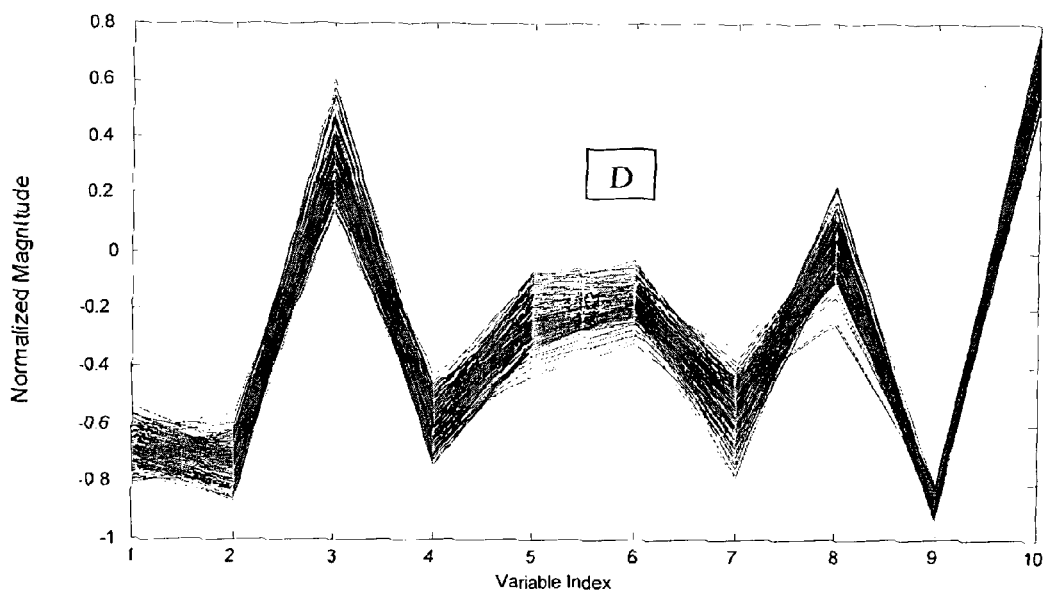

FIGS. 2A and 2B provide examples of two clusters with fitted samples selected from pulsed neutron inputs and prototypes. The prototypes are the heavy lines centered within the individual data set traces. These high-dimensional cluster profiles are shown in an X-Y plane, where X is the variable index: 1 for GR (gamma ray), 2 for SGIN (sigma formation intrinsic), 3 for RIN (inelastic gamma count rate ratio between detectors), 4 for RTMD (capture gamma count rate ratio between detectors), 5 for NTMD (near detector overall capture gamma count rate), 6 for FTMD (far detector overall capture gamma count rate) and 7 for SGBN (sigma borehole in near detector). Y is the normalized magnitude from −1 to +1 over the whole data range. Clearly, there is data similarity within the illustrated clusters, and data dissimilarity between the clusters.

The goal of performing cluster analysis, as described above, is to support artificial neural network, ANN, training-data selection. After input variables are classified into nearest clusters 24, each cluster is linked to its corresponding counterpart, the measurements to be used as targets in the training process. Most currently used plot functions cannot effectively show such comprehensive multiple-input/multiple-output relationships of the data. Cross plotting, for example, is limited by showing only a single input versus a single output. Post regression plots show correlation between the predicted outputs and the desired outputs, but the associated inputs are hard to be displayed at the same time. The conventional logging plot provides a separate curve for each individual measurement along the well depth, but does not include an ensemble of similar patterns of multiple measurements. Cluster linkage, however, conveniently provides more integrated graphic support to facilitate comprehensive analysis.

In FIGS. 3A through 3D, four plots, Cluster A through Cluster D, are presented to link the cluster inputs of a cased-hole pulsed neutron tool with corresponding actual open-hole triple-combo measurements. The number of variables is extended to ten, with the first seven being the same input variables as shown in FIGS. 2A and 2B, and last three being the triple-combo measurements (index 8 for deep resistivity, 9 for neutron porosity, and 10 for bulk density). The range of each open-hole attribute is also normalized between −1 and 1. Note that in each plot, the cluster analysis was only applied to the first seven input variables. The target data was accordingly linked with its input sample index recorded during the process. This approach provides a common framework for evaluating cluster input/output relationships, and for another important application, novelty detection, where target measurements are not available.

From FIGS. 3A-3D, it can be seen that the input/target relationship in Cluster A is quite linear. In Cluster B, the sample dispersions of open-hole measurements are much larger than that of the input variables, indicating a high non-linearity or inconsistency. Cluster B is a typical representative of tool responses to coal streaks that provide a problem for either pulsed neutron or density simple ratio routines. There is an outlier in Cluster C. Cluster D contains gas zone samples with small variation in both neutron porosity and bulk density. These plots provide a useful tool for problem diagnosis and model pre-assessment before the neural network is trained. These different cluster patterns may also be meaningful in developing zone or facies-based multiple models to improve prediction accuracy.

In the above steps, data inputs 10 have been clustered to close proximity (step 24, FIG. 1) and linked with target measurements in FIGS. 3A-3D. There can be up to several hundred clusters for the training well(s) depending on reservoir characteristics and geological formation types. In the next part of the process, cluster analysis and graphic inspection are integrated to characterize each cluster. This characterization process may be followed by a decision-making system to determine how many samples need to be selected from each cluster for model development.

Figure 4:
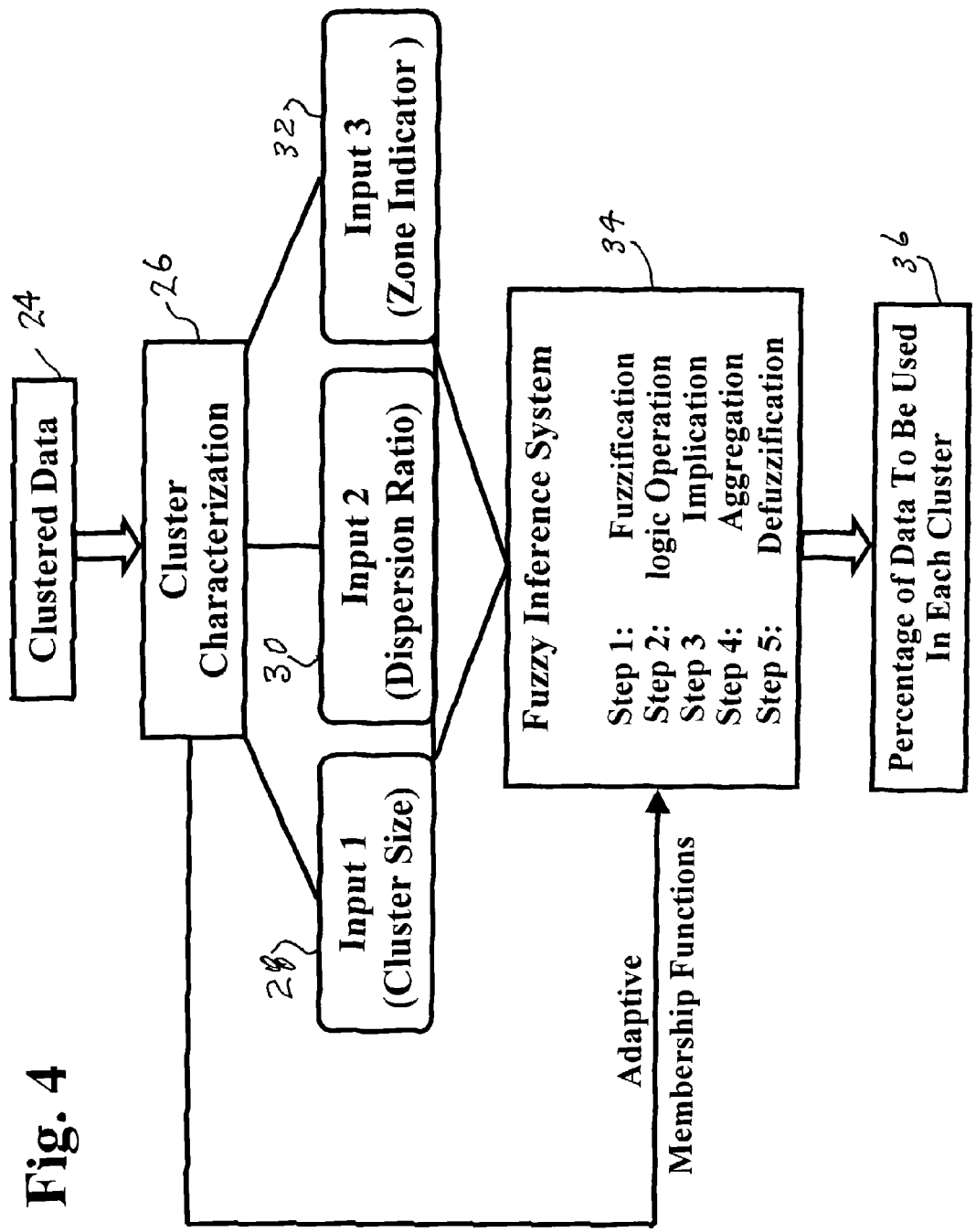
FIG. 4 is a flow chart illustrating steps of cluster analysis and characterization and a fuzzy inference system for selecting portions of data from the clusters.

FIG. 4 shows a simplified flow chart of the cluster characterization and selection process. Each data cluster 24 is analyzed for cluster variance and other metrics at step 26 and characterized accordingly. For example, one useful metric is the cluster size, i.e. how many multidimensional data samples are included in each cluster 24, may be measured at 28. For cluster variance analysis, the distance mean, defined as the mean of the within-cluster-sample distance to the cluster prototype, is probably the most important parameter. This parameter can be expressed in the ratio form, called dispersion ratio at step 30, and used as a cluster non-linearity index. The dispersion ratio is the ratio of target distance mean divided by the input distance mean. The zone indicator at step 32 takes account of the weight of key zones, allowing duplication of the key samples in the training set. All these parameters, plus others if necessary, may be used as inputs of the decision-making system for training-data selection.

Fuzzy inference is the process of formulating the mapping from a given input to an output using fuzzy logic, and has found many applications in decision-making. In a preferred embodiment, a fuzzy inference system is used to receive inputs from the cluster characterization process, and produce an output equal to the percentage of data to be used for training in each cluster. The inputs may be relative cluster size 28, cluster dispersion ratio 30, key zone indicator 32 and/or other variables derived from the preceding process. The functionality of the fuzzy inference system 34 can be described in several steps. In the step of fuzzification, the system receives the crisp input of each variable, and converts it to fuzzy input, which is a degree of satisfaction defined by the adaptive membership function. In the step of logic-operation, logical AND and OR operations are performed to represent the antecedent of each fuzzy rule, and its consequence is obtained in the step of implication. The outputs of the multiple rules are then aggregated in the step of aggregation to form a fuzzy set. Finally, for a given cluster, a single number is calculated at step 36 from the defuzzification step to indicate a percentage of the samples to be used in the training set.

In this embodiment, fuzzy rules constitute the basic decision-making strategy. The implementation of the other steps is straightforward. For example, the character A may represent relative cluster size, B may represent cluster dispersion ratio, C may represent key zone index ranged from 0 to 1, and D may represent percent data to be selected. An example of fuzzy rules may be:

If A is large, B is low and C is low, then D is low,
If A is small, B is med and C is high, then D is high; etc.
where the membership function large, small, low, med, high should be defined for each variable involved. To make the fuzzy inference system a useful tool, an adequate number of fuzzy rules are required. Similar to data preparation for other predictive tools, flexibility always exists for ANN training-data selection due to the capacity of the computer, experience of the designer, and limited information source. Some heuristic approaches can be combined with cluster information to obtain the best compromise between the processing simplicity and model predictability.

The percentages determined at step 36 are used to select a portion of data from each cluster 24. The data selected from each cluster 24 is combined into a training data set to be used to train a model for predicting the target data from real input data. As indicated above, a preferred embodiment uses an artificial neural network, ANN, as the predictive model. Normal training methods are used to train the ANN. For example, the training data set may typically be split into training and validation subsets. However, the training data selection process of the present invention results in a reduced training set which allows use of preferred training algorithms for training an ANN. After training and validation, the ANN may be tested with input data from other wells to determine if the model is good enough. When a model has been shown to accurately predict, or generate artificial logs, e.g. open hole logs, from real input data, for example cased hole log data, then it may be used to generate such artificial logs for other wells In the process described above, it was assumed that multiple well data were available, and all the available data was analyzed and processed at the same time. It is quite often the case that the original ANN model is trained with certain well(s) data first, and tested on a different well later to determine if the model is good enough. If not, the designer may want to add some new data selected from the testing well to the previous training set and retrain the network without re-processing the whole data set of the multiple wells. An example of how the above described process can be used to simplify retraining with the additional data is described below.

Before deciding whether or not to add the data from another well to the training set, novelty testing should be performed first, using the previously generated cluster prototypes from the training well(s) to classify the new data from the testing well. The analysis characterizes the new data and indicates how the testing inputs are similar to the training inputs, and how this similarity is related to the prediction error of testing data. The analysis can be used to establish a criterion to help add only "novelty" for new training, and can improve the applicability of the field model. This reduces the total amount of data added to the training set so that the most effective training algorithms can still be used.

Figure 5:
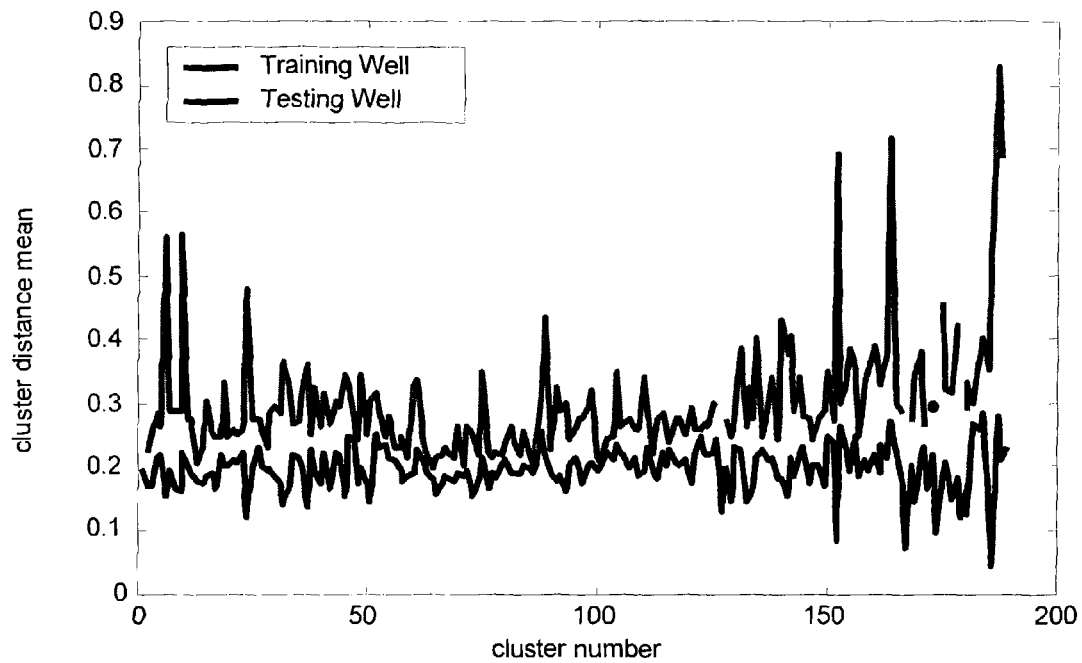
FIG. 5 is a plot of input data cluster distance mean deviations of a training well and a testing well.
Figure 6:
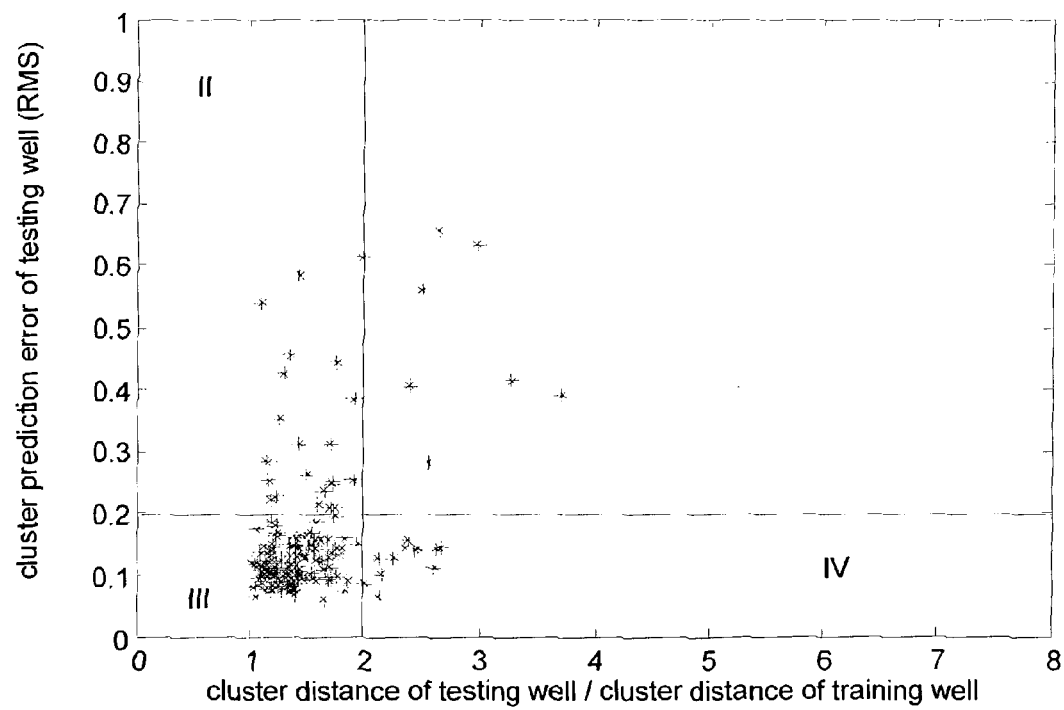
FIG. 6 is a cross plot of cluster distance ratio versus the cluster prediction error of the testing well.

FIGS. 5 and 6 summarize some results of this example. As previously discussed, the ANN model takes seven measurements from the cased-hole pulsed neutron logs as inputs to predict open-hole triple-combo outputs. FIG. 5 is a plot of input cluster distance means of a training well, the lower curve, and a testing well, the upper curve. The clusters, 189 in total number for the training well, were statistically generated using about 4500 feet of log data. The testing well, which is about three miles away from the training well, has its data (about 5000 feet of log data) fitted to 182 of the training well clusters, leaving blanks in the plot for the non-filled clusters. It can be seen from FIG. 5 that for each cluster, the distance mean of the testing well is consistently larger than that of the training well. Highly deviated mean values between the wells often indicate the existence of over range cluster inputs in the testing well.

FIG. 6 depicts cluster distance ratio, which is the ratio of the input cluster distance of the testing well over the same cluster distance of the training well, as an input similarity index, and plots that ratio versus the cluster prediction error of the testing well. The measurements in FIG. 6 are divided into four quadrants along the prediction error (root of mean-squared-error) set point of 0.2 and the distance ratio set point of 2, assuming that those values can be used as simple thresholds. In quadrant I, out-of-boundary data show that significantly different inputs lead to larger prediction error. In contrast to quadrant I, 138 of 182 clusters in quadrant III, which is the dominant part of the whole data set, are statistically located in the region where the clustered inputs are similar to their training well counterparts, and the prediction error is low. Probably the most questionable quadrant is quadrant II, which contains clusters with higher uncertainty exhibited (higher prediction error). The reasons for the coexistence of lower input dissimilarity and higher prediction error could be that dissimilar inputs are classified into the same cluster due to the use of a single distance measurement, or, non-linearity involved is so high that variation observed in output cannot be differentiated by its input. Any bad data in cased-hole and/or open-hole logs, and any inappropriate pre-processing of inputs and outputs will also affect prediction accuracy. As contrasted with quadrant II, quadrant IV contains the clusters whose cased-hole pulsed neutron inputs are linearly correlated with corresponding open-hole triple-combo outputs. The prediction is therefore adequately accurate even though the testing inputs seem out of range compared with the training inputs.

Based on the analysis stated in the previous paragraph, the clusters in quadrant I are clearly novel, and should be selected as retraining candidates. The major part of the data in quadrant III can be excluded from retraining consideration in general because of its higher input similarity and lower prediction error. Data in quadrant II need to be reinvestigated with caution to determine what causes inconsistency. Graphical inspection of cluster-analysis results can help identify problems in this quadrant. Data in quadrant IV is not crucial due to its linearity with output. Finally, only about 20 percent of the data in the second well (mainly from 40 clusters) were combined with the data of the primary training well to build the multi-well model.

Figure 7:
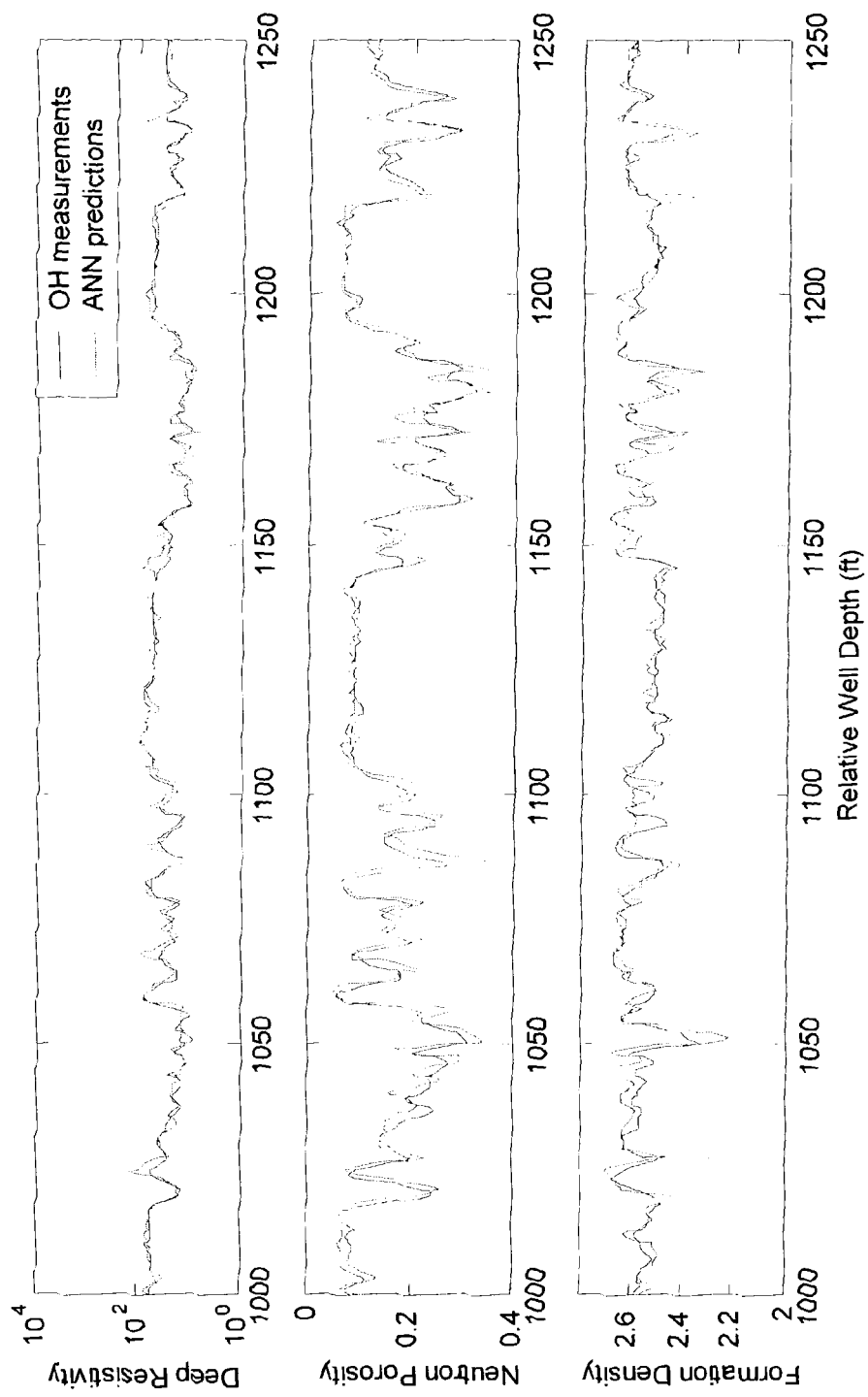
FIGS. 7, 8 and 9 provide three comparisons of ANN computed, i.e. synthetic, open hole logs with actual triple combo measurements.
Figure 8:
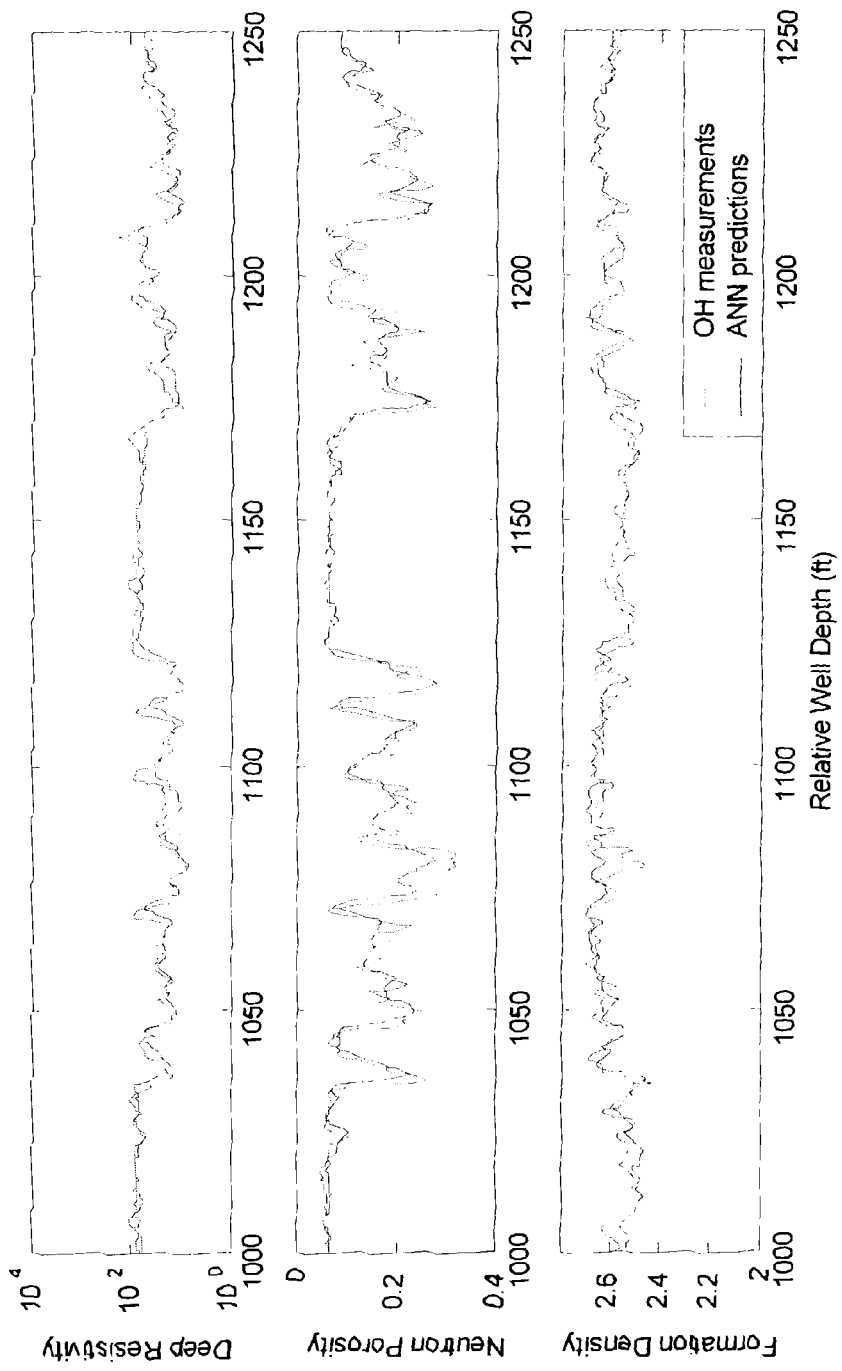
Figure 9:
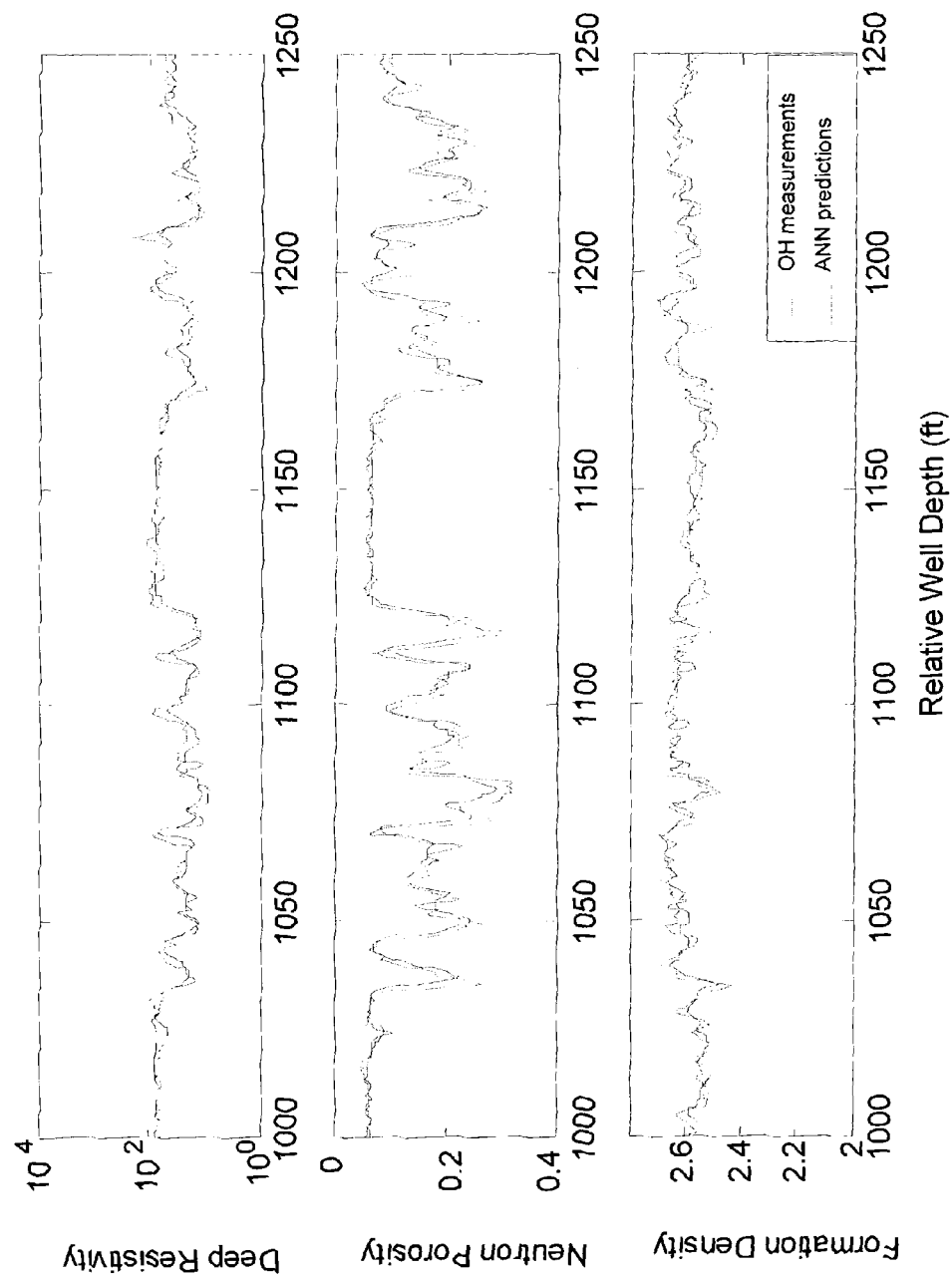

FIGS. 7, 8 and 9 provide three examples of ANN computed, i.e. synthetic, open hole logs plotted with actual triple combo measurements. The neural networks used in these examples were constructed by two layers (one-hidden layer), seven inputs, and three outputs.

FIG. 7 displays ANN predictions of 250-ft open-hole log data (including several gas bearing intervals, such as 110-540 ft) versus the actual log data of a first well, using the model trained from the same single-well data. About 50 percent of data in the first well were used in the training. The post-regression coefficients between the ANN predictions and the actual measurements over the 4500-ft logs can be up to 0.86 for deep resisitivity, 0.96 for neutron porosity and 0.95 for formation density. Excellent agreement is observed between the actual open-hole logs and those computed from the pulsed neutron data.

In FIG. 8, the same model was tested on a second well. Data from this second well was not used to train the ANN previously developed. This well also contained gas zones, including the interval 1120-70 ft. Agreement between the logs is good, but not as good as in FIG. 7.

The testing in FIG. 9 is on the same log subset of the second well as shown in FIG. 8, but the model was trained with significantly reduced joint data set of two wells using methods described above. Using only about 25 percent of data from each well, the overall (including bad data) post-regression correlation coefficients of the multi-well model on the second well were improved from 0.67 to 0.78 for deep resistivity, from 0.88 to 0.92 for neutron porosity, and from 0.85 to 0.91 for bulk density. However, the prediction accuracy of the first well was sacrificed slightly to balance total error due to the data inconsistency between the two wells. It is apparent from FIG. 9 that it is possible in a multi-well environment to use neural nets and clustering concepts to accurately simulate open hole triple combo logs from pulsed neutron log data. Also note that in FIGS. 7, 8 and 9 the gas zones were accurately profiled on the computed density logs. This is especially noteworthy since pulsed neutron tools do not contain gamma ray sources (such as those present in all density logging tools), and hence the gas zones represented a very challenging environment for the ANN model.

The above description and drawings illustrate how cluster analysis can be integrated with graphical visualization and fuzzy decision making to support sample selection in field model development using a neural network as a predictive framework. The methods discussed can also be used to support other analyst-based data interpretation and problem diagnosis with different predictive tools, i.e. other models. This approach greatly improves transparency of the conventional "black box" neural network to the designer, extends the model utility from the single-well source to multi-well sources in a cost-effective manner, and provides a powerful means to evaluate the data processing, input/output selection and the tool limitation for goal-related data mining. In logging and petrophysics applications, this method is most suitable to support multi-well field model development for medium-to-large-sized high-dimensional data interpretation. Using this method it can be seen that it is possible in a multi-well environment to generate excellent open-hole triple combo logs from cased-hole pulsed neutron data.

The following steps outline an embodiment of the cluster-analysis-based fuzzy reference system for neural network training sample selection according to the present invention.

1. Normalize the pre-processed multi-dimensional data.
2. Partition the well data into several subsets.
3. Evenly sample each subset along the coordinate of well depth.
4. Find the input sample cluster with predetermined inconsistency coefficient.
5. Locate the prototype of each sample cluster.
6. Merge sample prototype by reclustering with lower inconsistency coefficient.
7. Relocate the prototype of each sample cluster.
8. Fit all data into its nearest sample cluster.
9. Link each cluster's input and target data to be used in regression model.
10. Perform cluster statistics.
11. Determine the range of membership function of the fuzzy inference system.
12. Characterize the fuzzy input of each cluster.
13. Calculate fuzzy system output to obtain data percentage to be chosen from each cluster.
14. Sample each cluster to form neural network training set.

ALTERNATIVE APPLICATIONS

The present invention has been described primarily with respect to using multidimensional pulsed neutron log data from cased wells to predict geological values normally measured by logging open boreholes. However, it has other applications. It is generally applicable to training and use of predictive models having multiple geological and/or geophysical data inputs and producing one or more geological and/or geophysical values as output(s).

The present invention is useful in detecting changes in the formations which occur over time due to production of oil and gas. The interfaces between water, oil and gas changes as these materials are produced. In wells which were open hole logged before production, open hole logs would be different if they could be taken after production. The present invention allows synthetic open hole logs to be generated from cased hole logs taken after production so that a comparison can be made to determine changes which result from production.

The pulsed neutron logging tool used in the preferred embodiments provides at least seven separate data outputs. In a large field it may be desirable to run this logging tool in only some of the wells and use a simpler and less expensive tool in the remaining wells. The simpler tool may measure some, but not all of the parameters measured by the larger tool. The full set of measurements taken in a few wells may be broken into input and target values. The input values would be only the values which the simpler tool will measure in the remaining wells in the field. A predictive model can be trained as described in the present invention to generate synthetic logs of the target values for the wells in which only the simpler logging tool is run.

A similar application provides reconstruction of open hole or cased hole logs which have missing or defective data. For example, due to poor well conditions, open hole logs may have certain depth intervals without data or with defective data. After cased hole data is collected in such wells, a process like that described with reference to FIG. 7 can be used to reconstruct the open hole log or fill in the missing or defective data. This can be done by using the good open hole data, i.e. from depth intervals other than those with no data or defective data, together with cased hole data from the same intervals to train a model in accordance with the present invention. Then cased hole data from the intervals with no data or defective data can be input to the model to produce the missing open hole data.

In other cases, open hole data, possibly combined with cased hole data, can be used to reconstruct open hole logs with missing or defective data. Open hole logs normally produce a plurality of parameters. In some cases, poor well conditions may affect only one or two of the parameter readings. The log may include good data for the other parameters. In such a case, the parameters with good data can be used as the inputs for model training, and the parameter(s) which are partially missing or defective can be used as target data for training. The good parameters in the zones with defective data can then be input to the trained model to provide synthetic values for the missing parameters in the defective zones. In this scenario, parameters measured by cased hole logging may also be included as inputs during training and during data reconstruction if desired.

The data reconstruction process can also be used to reconstruct or fill in missing or defective cased hole log data. The process can be like any of those described in the preceding two paragraphs. The difference would be that the cased hole log may be missing data for one or more parameters in some depth intervals. The parameters which were accurately measured in those intervals, possibly combined with open hole parameters in those intervals, if available, can be used as inputs for training a model. The good portions of the parameter(s) which are partially missing would be the target data for training. The good cased hole data, and corresponding open hole data, if available, can then be input to the trained model to produce the missing data.

In some cases, open hole logs may have been run in a large number of wells in a field. At a later time it may be desired to run more current logging tools in the wells which are now cased. The process of the preferred embodiment may be essentially reversed to use the open hole measurements to predict some or all of the desired new logging measurements, e.g. the suite of pulsed neutron log data. This can be done by running a pulsed neutron tool in some of the wells in the field and using the data collected as the target data for training a predictive model. The input data would be the original open hole logs from these same wells. The open hole logs from the remaining wells may then be used with the model to predict the pulsed neutron tool data without actually running the tool in all of the remaining wells. Alternatively, a simpler pulsed neutron tool, as discussed above may be run in the remaining wells and its measurements may be used with the original open hole measurements as inputs to a model to predict the remaining data.

The multidimensional input data need not be a suite of measurements taken by a single instrument or set of instruments run in a borehole at the same time. Measurements from two or more instruments in the same well may be depth correlated and combined to form a set of input data parameters. These measurements may include, among others:

Nuclear Magnetic Resonance (NMR)
Dipole Sonic
Electric Micro Imaging Log
Pulsed Neutron
Pulsed Neutron & Carbon Oxygen Open Hole Logs Open Hole Triple Combo (Resistivity, Density, Neutron, Sonic)

Cased Hole Production Logs

Subsurface Core Data

Formation Pressure Data

Vertical Seismic Profiling

Other types of data such as measurements of formation samples, e.g. drill cuttings or sidewall cores, may also be used. The input data may also include measurements taken from the earth's surface, e.g. seismic data, which may be depth correlated with borehole log data. In similar fashion, the actual target data used in training may be data from more than one logging tool and/or may include non-borehole data such as seismic data. Predicted target measurements may likewise be the types of measurements normally measured by a logging tool or data normally measured by other means, e.g. seismic.

Another alternative application for clustering techniques (including Self Organization Mapping) as applied to subsurface and/or surface measurements is facies identification. Facies identification from logging data can be an extremely important predictive product from these techniques in terms of rock typing for fracture stimulation design, petrophysical analysis, permeability determination for fluid flow characteristics, and understanding subsurface reservoir properties. Clustering of multidimensional input data measurements will group/organize these measurements in such a way to have geologic significance and thus further the operator's knowledge of their producing reservoirs.

The present invention provides new flexibility in development of hydrocarbon, e.g. oil and gas, bearing fields. For example, a plan for development of a field may call for drilling a plurality, e.g. fifty, wells into the producing formations in the field. For various reasons, such as those discussed in the background section above, it may be very desirable to limit open hole logging to only a portion of the fifty wells, e.g. maybe only ten or fewer wells. After the wells are drilled and cased, cased hole logs, e.g. pulsed neutron logs, may be run in all wells in the field. The few open hole logs together with the cased hole logs from the same wells may then be used as the training data according to the present invention to develop a model, e.g. an artificial neural network, which is representative of the entire field. The model may then be used to produce synthetic open hole logs for all wells in the field, or at least those which did not have actual open hole logs, by inputting the cased hole log data into the model.

Advantages of the Invention

The present invention applies a goal related clustering method. In this new approach, the objective was not to develop a theoretically novel clustering method. Instead, it was to select and integrate clustering methods to achieve a particular goal. This invention provides a cluster-analysis-based algorithm to efficiently locate the similar data patterns, and produces results that are interpretable, comprehensible, and usable for neural network training sample selection.

The present invention provides a reduced memory requirement. To make the clustering algorithm suitable to large data sets, data partitioning and prototype merging methods are included in this invention and results in reduced memory requirement. The strategy of NN training sample selection can then be deliberately determined from the cluster density distribution and importance of the data patterns. This facilitates the removal of redundant data and insignificant data, and allows applying some powerful, but memory-constrained training algorithms to the well-selected data set for field model development.

The invention provides enhanced diagnostic capability. Problem diagnosis is challenging in data mining. In this invention, the high-dimensional data is displayed in an X-Y plane to show what the input/output mapping relationship in the cluster looks like. This makes model pre-assessment convenient before the neural network is trained, facilitates the user to locate the outlier, to reselect input parameters and to reinvestigate the pre-processing method. In addition, it makes novelty detection on new data practical by using the same cluster analysis framework.

The present invention incorporates fuzzy-adapted decision making. Unlike the common practice of placing the fixed percent of total data in the training set, the new approach involves a fuzzy inference system to help decision making in training sample selection. The membership function of the fuzzy inputs and outputs are defined based on the statistical results of cluster analysis, which is problem dependent and can be adapted dynamically when the cluster statistics are changed.

It is apparent that various changes can be made in the apparatus and methods disclosed herein, without departing from the scope of the invention as defined by the appended claims. For completeness, the claims are summarized below.

What we claim is: a method for predicting open borehole logging measurements from actual cased borehole logging measurements, comprising: collecting open hole logging measurements; collecting cased borehole logging measurements; dividing the cased borehole logging measurements into a set of clusters; associating each cased borehole logging measurement with corresponding open hole logging measurements; performing an analysis of the cased borehole logging measurements and corresponding open hole logging measurements for each cluster; selecting a subset of the cased borehole logging measurements and corresponding open hole logging measurements from each cluster based on results of the analyses; training a predictive model with the selected measurements; and using the trained predictive model to predict open hole logging measurements in response to cased borehole logging measurements.

In the foregoing method, the step of performing an analysis may comprise: plotting the cased borehole logging measurements and corresponding open hole logging measurements for each cluster; visually inspecting each plot; and selecting data from each cluster based on the visual inspection.

Alternatively, in the foregoing method, the step of performing an analysis may comprise performing a statistical analysis of the cased borehole logging measurements and corresponding open hole logging measurements within each cluster. If so, the method may further comprise processing the results of the statistical analysis with fuzzy inference to assign a percentage to each of the second clusters.

In the foregoing method, the step of dividing the cased borehole logging measurements into a set of clusters may comprise: dividing the cased borehole logging measurements into a plurality of first subsets; dividing each of the first subsets into a plurality of first clusters; generating a first set of prototypes each representing one of the first clusters; and dividing the first set of prototypes into a plurality of second clusters. If so, the method may further comprise assigning each of the cased borehole logging measurements to one of the second clusters. The cased borehole logging measurements may be outputs of a pulsed neutron logging tool.

In the foregoing method, the predictive model may be an artificial neural network.

In the foregoing method, the open borehole logging measurements may comprise measurements representing one or more of neutron porosity, formation density and deep resistivity.

We also claim: a method for predicting open borehole geophysical measurements from actual cased borehole geophysical measurements, comprising: collecting open hole geophysical measurements; collecting cased borehole geophysical measurements; selecting a subset of the cased borehole measurements and corresponding open hole measurements as a training data set; training a predictive model with the selected measurements; and using the trained predictive model to predict open hole geophysical measurements in response to cased borehole geophysical measurements.

We also claim: a method for predicting cased borehole geophysical measurements from actual open borehole geophysical measurements, comprising: collecting open hole geophysical measurements; collecting cased borehole geophysical measurements; selecting a subset of the open hole measurements and corresponding cased borehole measurements as a training data set; training a predictive model with the selected measurements; and using the trained predictive model to predict cased hole geophysical measurements in response to open borehole geophysical measurements.

We also claim: a method for producing a synthetic log of at least one geophysical parameter for a well, comprising: collecting a first log of a plurality of geophysical parameters, including the at least one geophysical parameter, in a first well, the log comprising a plurality of multidimensional data samples; dividing the data samples into a set of clusters based on the geophysical parameters other than the at least one geophysical parameter; selecting data from each cluster; training a predictive model with the selected data; collecting a second log of the plurality of geophysical parameters, excluding the at least one geophysical parameter, in a second well; and inputting the second log to the predictive model to produce a synthetic log of the at least one geophysical parameter for the second well.

The foregoing method may further comprise analyzing the data in each cluster. If so, the method may further comprise plotting the data in each cluster; and visually inspecting the data plots. If so, the method may further comprise identifying formation type represented by a cluster.

We also claim a method of operating a hydrocarbon bearing field, comprising: drilling a plurality of wells in the hydrocarbon bearing field; performing open hole logging in a subset of the wells; performing cased hole logging in substantially all of the wells including the subset of wells; using open hole logging data and cased hole logging data from the subset of wells to train a predictive model to produce synthetic open hole data in response to inputs of cased hole data; and using the trained predictive model and cased hole data from the wells to produce synthetic open hole data.

The foregoing method may further comprise using the synthetic open hole data to plan operations for the wells.

In the foregoing method, the subset of wells may comprise less than one-half of the plurality of wells. Alternatively, the subset of wells may comprise less than one-fifth of the plurality of wells.

What we claim is:

1. A method of operating a hydrocarbon bearing field, comprising:
    drilling a plurality of wells in the hydrocarbon bearing field,
    performing open hole logging in a subset of the wells,
    performing cased hole logging in substantially all of the wells including the subset of wells,
    using open hole logging data and cased hole logging data from the subset of wells to train a predictive model to produce synthetic open hole data in response to inputs of cased hole data, and
    using the trained predictive model and cased hole data from the wells to produce synthetic open hole data
    wherein the subset of wells comprises less than one-half of the plurality of wells.

2. A method according to claim 1, further comprising using the synthetic open hole data to plan operations for the wells.

3. A method according to claim 1, wherein the subset of wells comprises less than one-fifth of the plurality of wells.

* * * * *